B. H. MELENDY.
Improvement in Door Securers.

No. 124,503. Patented March 12, 1872.

Witnesses:
P. C. Dieterich
Geo. W. Mabee

Inventor:
B. H. Melendy
per _____
Attorneys.

124,503

UNITED STATES PATENT OFFICE.

BRYANT H. MELENDY, OF AMHERST, NEW HAMPSHIRE.

IMPROVEMENT IN DOOR-SECURERS.

Specification forming part of Letters Patent No. 124,503, dated March 12, 1872.

Specification describing a new and useful Improvement in Door-Fastener, invented by BRYANT H. MELENDY, of Amherst, in the county of Hillsborough and State of New Hampshire.

Figure 1:
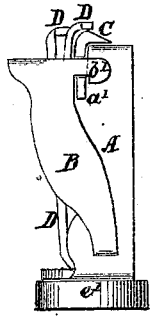
Figure 2:
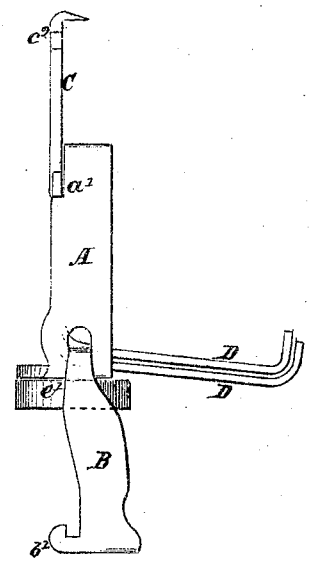
Figure 3:
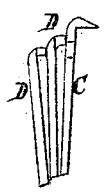
Figure 4:
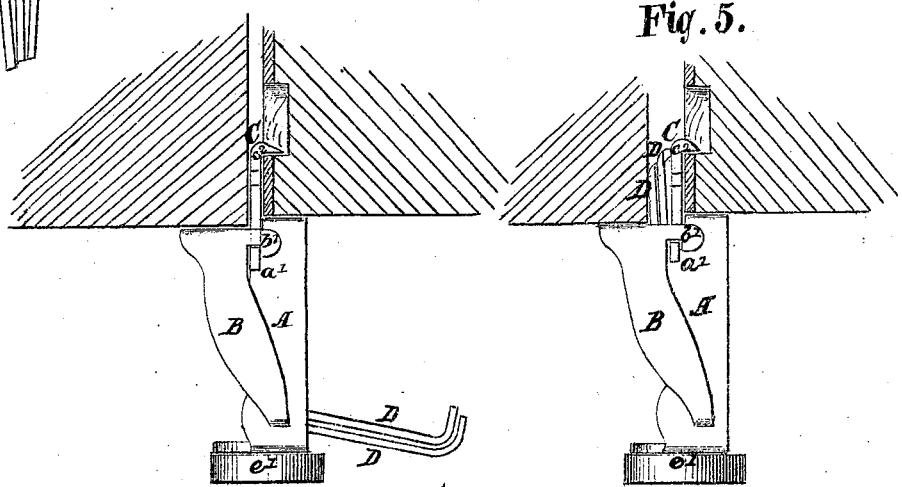
Figure 5:
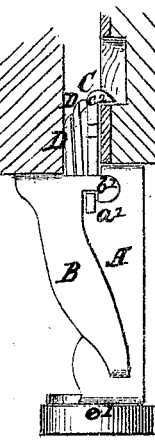
Figures 6, 7:
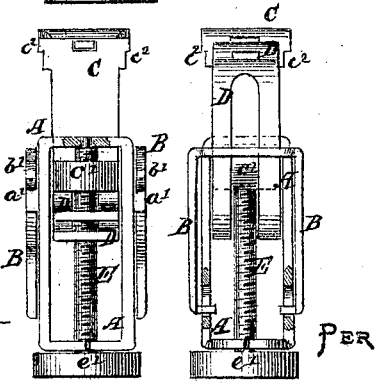

Figure 1 is a side view of my improved fastener, closed for carrying in the pocket. Fig. 2 is a side view of the same, opened to apply to a door. Fig. 3 is a detail edge view of the hook and compensators. Fig. 4 represents the same as applied to a door when the compensators are not required. Fig. 5 represents the same as applied to a door when the compensators are required. Fig. 6 is a front view of the same in the position shown in Fig. 5. Fig. 7 is a rear view of the same in the position shown in Fig. 5.

Similar letters of reference indicate corresponding parts.

My invention has for its object to furnish an improved pocket door-fastener, which shall be so constructed that it may be readily and effectively applied to a door to fasten it, whatever may be the character of the door or the shape of the door-casing or molding, and which shall, at the same time, be so constructed that it may be readily applied to and detached from the door, and may be conveniently carried in the pocket when not required for use; and it consists in the construction and combination of the various parts of the fastener, as hereinafter more fully described.

A is the main part or frame of the fastener, which is struck up into the form shown in the drawing. B is the fastening or locking part or frame of the device, which is also struck up into the form shown in the drawing, and the ends of which are bent inward to enter holes in the side bars of the frame or part A, near their outer ends, to pivot the said part B to the said part A. Upon the forward parts of the side bars of the frame B are formed hooks $b'$ to hook upon lugs $a'$ formed upon the forward part of the side bars of the frame A, as shown in Figs. 1, 4, 5, and 6. The forward edge of the forward end of the part B is notched to receive the hook C and the compensator or compensators D when used. The forward end of the piece C is sharpened and bent forward at right angles to form a sharp-edged hook, which is designed to be inserted into the slide-bolt socket of the door-casing, or to be forced into the said door-casing when no socket is formed in it. Upon the rear end of the hook C is formed, or to it is securely attached a nut, $c^1$, through which passes a screw, E, which is swiveled to the ends of the frame A, and has a milled head, $e'$, formed upon or attached to its outer end, so that the hook C may be forced outward or drawn inward by turning the said swiveled screw E. The compensators D—one, two, or more of which may be used—are slotted longitudinally, as shown in Fig. 7, to receive the swiveled screw E; and their rear ends are bent inward, as shown in Figs. 2 and 4, so that the compensators may be turned forward parallel with the hook C for carriage or when required for use, as shown in Figs. 1, 5, 6, and 7, and so that the said compensators may be slipped back out of the way, as shown in Figs. 2 and 4, when not required for use.

In using my improved door-fastener, the hook C is inserted in the bolt-socket of the door-casing or against said casing, the screw E is then turned to bring the end of the part or frame A close up against the casing, and one or more of the compensators D are moved forward if required. The door is then closed, the part or frame B is swung forward and the hooks $b'$ hooked upon the lugs $a'$, securely fastening the door. The frames A and B may be moved forward and back upon the hook C at any time by simply turning the screw E, and thus adapts the fastener to be applied to any door, whatever may be the form of its casing.

Upon the sides of the forward end of the hook C are formed shoulders $c^2$, which, when the fastener is closed for carrying in the pocket, prevents the frame B from slipping forward, and becoming unhooked from the frame A.

Having thus described my invention, I claim as new and desire to secure by Letters Patent—

1. An improved door-fastener formed by the combination of the frame A, pivoted locking frame B, hook and nut C $c^1$, and swiveled screw E, with each other, substantially as herein shown and described, and for the purpose set forth.

2. The combination of the compensators D, one or more, with the frame A $a'$, pivoted frame B $b'$, hook and nut C $c^1$, and swiveled screw E, substantially as herein shown and described, and for the purpose set forth.

BRYANT H. MELENDY.

Witnesses:
  NATHANIEL M. MELENDY,
  ISAAC J. RUSS.